United States Patent [19]

Brown

[11] 4,228,832
[45] Oct. 21, 1980

[54] VACUUM ENCAPSULATING APPARATUS

[76] Inventor: Frank R. Brown, 84 Stony Hill Rd., Brookfield Ctr., Conn. 06805

[21] Appl. No.: 877,268

[22] Filed: Feb. 13, 1978

[51] Int. Cl.$^2$ .................................................. B65B 31/02
[52] U.S. Cl. ...................................... 141/51; 141/37; 141/59
[58] Field of Search ...................... 141/61, 51, 39, 37, 141/43, 59

[56] References Cited

U.S. PATENT DOCUMENTS

| 2,059,455 | 11/1936 | Hoar | 141/51 |
| 2,884,963 | 5/1959 | Erndt | 141/51 |

FOREIGN PATENT DOCUMENTS 1204807  8/1959  France ...................................... 141/59

*Primary Examiner*—Steven L. Stephan
*Attorney, Agent, or Firm*—William G. Rhines

[57] ABSTRACT

This invention relates to apparatus for applying liquids to objects under vacuum, and in one embodiment, particularly suitable for injecting potting compounds into electronic components, comprises a portable, bell-shaped housing, preferably made from transparent material and having a bottom, circular aperture surrounded by a vacuum gasket, conduit means for introducing vacuum into the interior chamber of the bell-shaped housing, regulator means for regulating the degree of vacuum so introduced into said housing, gauge means for monitoring the degree of vacuum within said housing, container means for holding the potting compound in liquid form, liquid conduit means for transferring liquid potting compound from said container means to a desired location within said housing, and a liquid flow regulation valve for controlling the rate of flow of liquid potting compound through said liquid conduit means.

17 Claims, 1 Drawing Figure

U.S. Patent
Oct. 21, 1980
4,228,832
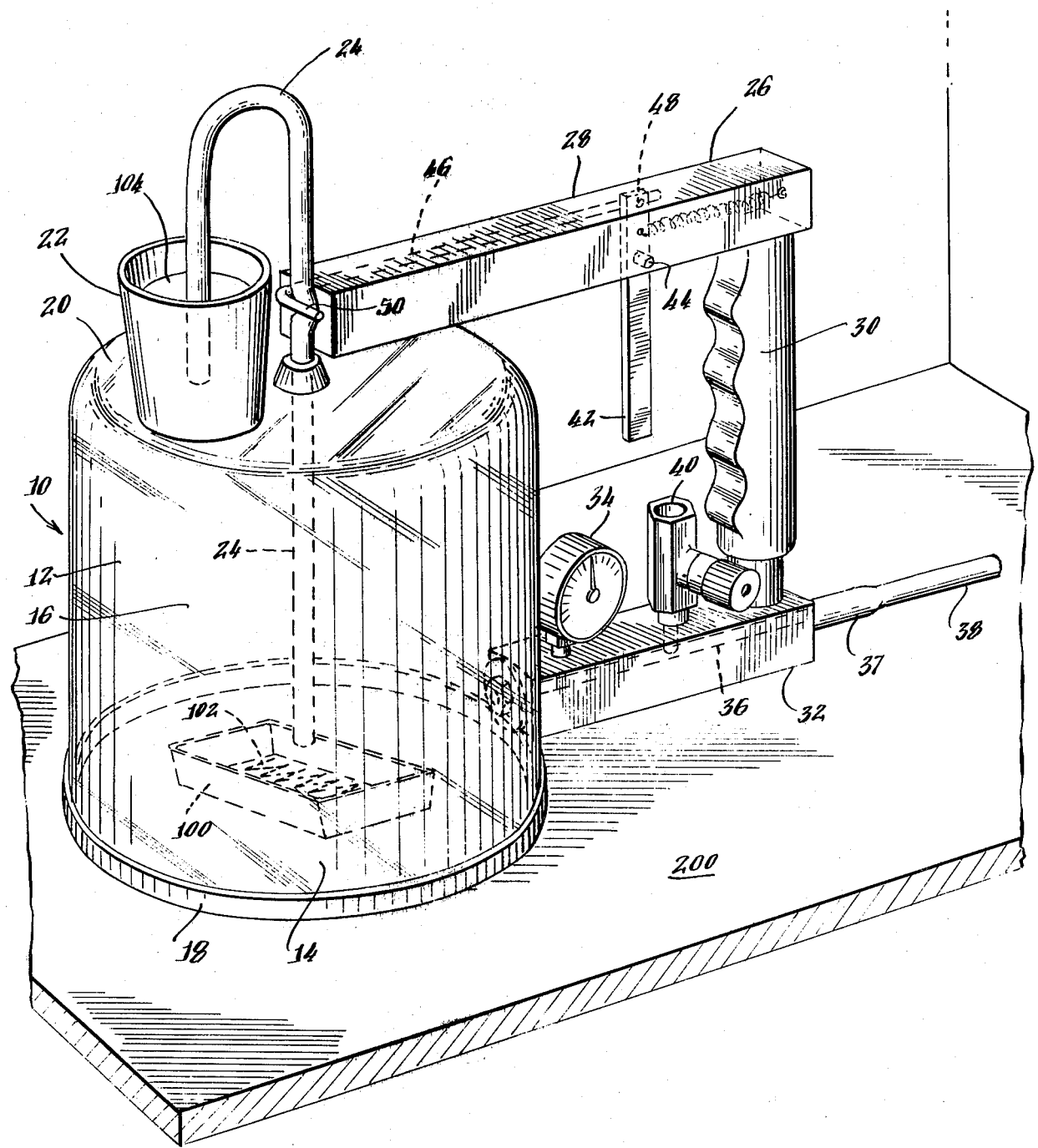

VACUUM ENCAPSULATING APPARATUS

BACKGROUND OF INVENTION

In various fields of manufacture, such as the making of electronic components, it is sometimes desired to apply resins or other materials in liquid form to objects under conditions of varying degrees of vacuum, so as to ensure their being degassified; the material so applied subsequently becoming hardened by drying, the application of heat, etc. Thus, for example, box-like elements containing circuit components may be filled with such materials; such operations being sometimes referred to as "potting" and the materials so applied as "potting compounds". In so doing, the usual practice has been to load the objects with the potting compound applied, into an evacuable container, seal the container, and then apply vacuum to it to perform the desired operations. The excessive handling and time delay problems attendant such procedures will be obvious.

Accordingly, it is an object of the present invention to provide apparatus for the vacuum potting of objects.

Another object of this invention is to provide such apparatus in a form which is portable.

Still another object of this invention is to provide apparatus for achieving the foregoing objectives in a form in which the application of the potting compound can take place in an evacuated environment.

Yet another object of this invention is to provide apparatus to achieve the foregoing objectives in a form which permits easy regulation of the degree of vacuum and rate of flow to which the potting compound is exposed in the course of application.

SUMMARY OF INVENTION

Desired objectives may be achieved through practice of the present invention which, in one embodiment, is in the form of vacuum potting apparatus comprising a portable bell having an interior chamber that has a circumferentially gasketed bottom opening, means for interconnecting the interior of said bell with a vacuum source, container means for containing liquid potting compound, and conduit means describing a flow-path from the interior of said container means to the interior of said bell. Other embodiments include means for regulating the degree of vacuum applied to the apparatus, means for monitoring the vacuum level within the apparatus, and/or means for regulating the rate of flow of potting material through the flow path.

DESCRIPTION OF DRAWING

This invention may be understood from the description which follows and from the attached drawing in which The FIGURE is a perspective view of an embodiment of this invention.

DESCRIPTION OF PREFERRED EMBODIMENTS

Referring to the FIGURE, there is depicted, in perspective view, an embodiment of this invention in the form of a portable vacuum potting apparatus 10. Its main body in the form of a bell 12 having an interior chamber 16; the bell 12 preferably being made from clear, strong glass, plastic or other transparent material, to tolerate the pressure differentials involved while permitting visual observation from the exterior of procedures taking place within the bell. The bell 12 has an aperture 14 at the bottom, surrounded by a gasket 18 made from soft rubber or other appropriate material suitable for juxtaposing to a table top, work bench, or other surface, to effect a vacuum seal therewith. Associated with apparatus, is a container 22 for potting material, with a flow path in the form of a conduit 24 extending from the container 22 to the interior 16 of the bell 12 through a connection 25 in the top 20. It will be apparent that although the container 22 is depicted in this embodiment as being cup-like and positioned on the top 20 of the bell 12, it could be in any of a variety of shapes or forms, and could be positioned beside or beneath the apparatus as well since the use of vacuum obviates the necessity of relying on gravity to cause potting components to flow through the conduit 24. It should also be understood that advantageously the container 22 and the conduit 24 may be made from relatively inexpensive, and therefore expendable material, such as clear plastic, so that the contents are readily visible, cleaning is obviated and contamination minimized, and the operator may further avoid skin contact with the potting compound which may be toxic, an irritant, or otherwise undesirable to touch. Affixed to the side of the bell 12 is a handle 26 having a top member 28, a grip member 30, and a bottom member 32. The bottom member 32 has an internal vacuum conduit 36 extending from the interior 16 of the bell 12 to a vacuum source (not shown) hose connection 37 to which a vacuum source hose 38 may be attached. The vacuum conduit 36 also has a vacuum monitoring means in the form of a gauge 34, and a vacuum intensity regulator in the form of a bleed valve 40, associated with it. The top member 28 has a potting compound flow control means in the form of a trigger 42 associated with it, that is pivoted therefrom by means of a pintle pin 44 and is connected by another pin 48 to a connecting rod 46, an angle 50 in the end of which, being normally biased by spring 52 towards causing the conduit 24, if made from soft plastic, to be closed off, in effect makes a flow control valve in the conduit 24.

In use, the apparatus 10, being portable, may be picked up by the grip 30, placed over an object 100 to be "potted", and the interior 16 of the bell 12 evacuated by vacuum applied via the hose 38 and conduit 36 to a desired amount monitored by the gauge 34 and regulated by the bleed valve 40. The potting compound flow valve 50 may then be opened through operation of the trigger 42 and its associated linkages; the gasket 18 optionally augmented by vacuum grease, preserving the vacuum level as it compresses against the associated table top 200. By this means, potting compound 102 may be caused to flow at a desired rate and in a desired amount under evacuated environmental conditions; from the container 22 through the conduit 24 into the element 100 which it is desired to pot. By this means, the potting compound is degassed as it flows into the vacuum chamber and air bubbles are eliminated in the evacuated mold. It will also be apparent that through use of apparatus embodying this invention, encapsulating or potting may be done relatively more quickly and efficiently since the bell size may be chosen to be only slightly larger than that of the component to be potted, as contrasted, for example, with the relatively larger and fixed dimensions of a vacuum cabinet. Further, the apparatus itself uses less material and is less expensive to build and easier to operate.

It is to be understood that the embodiment which has been illutrated and described is by way of illustration and not of limitation, and that a wide variety of embodiments may be made without departing from the spirit or scope of this invention.

I claim:

1. Portable vacuum potting apparatus comprising
a bell having an interior chamber that has a bottom opening, the edge region of which is adapted for juxtapositioning to an associated surface in vacuum tight relationship thereto, and an associated carrying handle,
said apparatus including means for interconnecting the interior of said bell with a vacuum source and fluid conduit means describing a flow-path to the interior of said bell through which fluid may pass from an associated container,
and said handle including regulating means for regulating the flow of fluid through said fluid conduit.

2. The apparatus described in claim 1, including regulating means for regulating the degrees of vacuum induced in said interior chamber.

3. The apparatus described in claim 2 including monitoring means for monitoring the degree of vacuum within said interior chamber.

4. The apparatus described in claim 3 wherein a side wall portion of said bell is transparent to facilitate viewing said interior chamber.

5. The apparatus described in claim 2 wherein a side wall portion of said bell is transparent to facilitate viewing said interior chamber.

6. The apparatus described in claim 1 including monitoring means for monitoring the degree of vacuum within said interior chamber.

7. The apparatus described in claim 6 wherein a side wall portion of said bell is transparent to facilitate viewing said interior chamber.

8. The apparatus described in claim 1 wherein a side wall portion of said bell is transparent to facilitate viewing said interior chamber.

9. Portable vacuum potting apparatus comprising a bell having an interior chamber that has a bottom opening, the edge region of which is adapted for juxtapositioning to an associated surface in vacuum tight relationship thereto, and an associated carrying handle,
said apparatus including means for interconnecting the interior of said bell with a vacuum source and fluid conduit means describing a flow-path to the interior of said bell through which fluid may pass from an associated container,
said handle including said means for interconnecting the interior of said bell with said vacuum source,
and said handle including regulating means for regulating the flow of fluid through said fluid conduit.

10. The apparatus described in claim 9 including valve means for regulating the rate of flow through said flow path.

11. The apparatus described in claim 10, including regulating means for regulating the degree of vacuum induced in said interior chamber.

12. The apparatus described in claim 11 wherein a side wall portion of said bell is transparent to facilitate viewing said interior chamber.

13. The apparatus described in claim 11 including monitoring means for monitoring the degree of vacuum within said interior chamber.

14. The apparatus described in claim 13 wherein a side wall portion of said bell is transparent to facilitate viewing said interior chamber.

15. The apparatus described in claim 10 including monitoring means for monitoring the degree of vacuum within said interior chamber.

16. The apparatus described in claim 15 wherein a side wall portion of said bell is transparent to faciliate viewing said interior chamber.

17. The apparatus described in claim 10 wherein a side wall portion of said bell is transparent to facilitate viewing said interior chamber.

* * * * *